United States Patent Office 3,051,670
Patented Aug. 28, 1962

3,051,670
COATING COMPOSITION COMPRISING CELLULOSE DERIVATIVE AND A CRYSTALLINE POLYMER
William G. Grantham, Wilmington, Del., assignor to American Viscose Corporation, Philadelphia, Pa., a corporation of Delaware
No Drawing. Filed Nov. 13, 1959, Ser. No. 852,634
11 Claims. (Cl. 260—17)

This invention relates to improved cellulose derivative coatings for film material. More particularly, it concerns cellulose derivative coatings having improved slip and anti-blocking properties when applied to sheet or film material.

Cellulose derivative coatings or coating compositions consisting predominantly of cellulose derivatives, are suitably applied to film or sheet material such as regenerated cellulosic film, cellulose derivative film, paper, albuminous material (gelatin, agar-agar, casein), or films made from vinyl resins, polyethylene, Saran, rubber derivatives, i.e., rubber hydrochloride, chlorinated rubber, or material prepared by reacting rubber and metal halide such as boron trifluoride, stannous and stannic chloride, stannic acid and other materials. The cellulosic derivative coating, while lending improved properties to the base film, either degrades or does not sufficiently improve the slip or anit-blocking properties of the material. In addition, various added components of the cellulose derivative coating composition either fail to improve or degrade these properties.

The terms "slip" and "block" or "blocking" are well known in this art. "Slip" generally refers to the relative ability of each contiguous sheet or film to slide from its adjacent sheet in a stack or pile. "Block" refers to that amount of adhesion between contiguous sheets in a pile or spool of material.

It is an object of this invention to provide a cellulose derivative coating for a film or sheet material having much improved slip and anti-blocking properties.

It is a further object of this invention to provide a cellulose derivative coating composition containing various film improving additives which composition also lends improved slip and anti-blocking properties to film and sheet material coated therewith.

These and other objects of the invention are attained by incorporating a crystalline polymer selected from the group consisting of polyvinyl cyclohexane, polyallyl cyclohexane, and poly-4-phenyl-1-butene, in a cellulose derivative film coating composition in an amount sufficient to improve anti-blocking and slip properties. The usual amount of polymer incorporated in the coating ranges from 0.1 to 3.0% by weight based on the solids; however, from 0.5 to 2.0% is preferred.

In the present invention, it is preferred to use a cellulosic film former in the compositions such as organic solvent-soluble cellulose ethers, for example ethyl, or benzyl cellulose, cellulose esters such as cellulose nitrate, which is particularly useful; cellulose acetate, and such mixed esters or ether-esters as cellulose acetate-nitrate, cellulose acetate-propionate or ethyl cellulose-nitrate. These cellulose derivatives may be of various degrees of conversion, for example, cellulose nitrate of various nitrogen contents and generally comprise from about 40 to 99.9% by weight of the coating.

Generally the coating composition is applied as a lacquer, which comprises from about 5 to 25% by weight of solids and a remainder of organic solvent. The organic solvent includes for example ethyl acetate, butyl acetate, acetone, methyl ethyl ketone, lower alcohols such as ethyl and butyl alcohol, ether-alcohols such as the Cellosolves; heptane, benzene, xylene, toluene, and mixtures of these organic liquids.

The compositions of the instant invention may or may not produce moistureproof coatings and moistureproof selp-sustaining films, as desired. When a moistureproof product is desired, however, there may be employed as moistureproofing agents, waxes or wax-like material such as paraffin, petrolatum, ceresin, Japan wax, palm wax, beeswax, certain chlorinated hydrocarbons, chinese insect wax, and other synthetic waxes or wax-like materials. If some of these waxes are too soft for the purpose desired, they may be mixed with harder waxes of the groups or with carnauba wax, candelilla wax or other harder waxes. Generally, paraffin serves as a satisfactory moistureproofing agent which may be hardened, if necessary, by admixture with carnauba wax or candelilla wax. The moistureproofing wax is usually added in amounts ranging from about 1 to 10% by weight of the solids.

It has been found advantageous to include, particularly when employing both a moistureproofing agent and a cellulose derivative, some material which will improve the compatibility of the ingredients contained therein. This material is referred to as a blending agent and is usually of a resinous nature, although this is not absolutely necessary. When the blending agent is resinous, advantage may be taken of its film-forming characteristics, if any, and sufficient quantity may be added to a coating composition to contribute towards the body and build of that composition in addition to the blending action. Depending on the nature of the blending agent, more or less plasticizing action on the cellulose derivative may be obtained. The amount of blending agent used in the composition of this invention generally ranges from about 1 to 20% by weight based on the solids.

As the blending agents, any of the natural or synthetic resins commonly available may be used so long as they are compatible and form homogeneous mixtures. Such resins may include ester gum, rosinates, hydrogenated rosin, hydrogenated rosin esters, maletic anhydride treated rosin, dammar, copal, kauri, alkyd resins, vinyl derivatives, chlorinated diphenyl resins, and soluble resins of the phenol-formaldehyde type. Non-resinous blending agents may be used when they yield homogeneous mixtures, and these may include hydrogenated castor oil, castor oil phthalate, lanolin or wool grease, ethyl abietate, methyl abietate, diethylene glycol rosinate, diethylene glycol hydrorosinate, or the like.

Plasticizers or softeners are used in coatings of the present type to impart the desired flexibility to the coating films formed therefrom. The plasticizers are also useful to make moistureproof coatings of nitrocellulose and wax, thermoplastic or heat-sealable. They are generally used separately or in mixtures in amounts from about 5 to 50 percent by weight based on the lacquer solids. Examples of useful plasticizers are the phthalates including dibutyl phthalate, dilauryl phthalate, cyclohexyl butyl phthalate, di(methyl-cyclohexyl) phthalate, dibenzyl phthalate and diphenyl phthalate; dicarboxylic acid esters including dibutyl sebacate, dioctyl sebacate, di-2-ethyl hexyl sebacate, dibutyl adipate, dicyclohexyl adipate, dibutyl azelate and di-2-ethylhexyl azelate; phosphates including tricresyl phosphate, tri-2-ethylhexyl phosphate, trioctyl phosphate, tri-p-t-butyl phenyl phosphate, tributoxy ethyl phosphate, and tri-cyclohexyl phosphate, phthalimidoethyl propionate; esters of o-benzoyl benzoic acid including butyl benzoyl benzoate; triethylene glycol dibenzoate; derivatives of toluene sulfonamide such as p-toluene sulfonethylamide; alkyd or polyester resins prepared by the condensation and polymerization of polyhydric alcohols including glycerol and ethyl glycol with polybasic acids such as adipic, sebacic, azelaic and glutaric acids; etc.

Anti-blocking agents other than those claimed herein, such as amorphous styrene-butadiene copolymer are also components found in coating compositions of this invention.

The polymers of this invention, namely, polyvinyl cyclohexane, polyallyl cyclohexane and poly-4-phenyl-1-butene, are crystalline materials produced in accordance with known processes usually employing polymerization catalysts and catalyst systems to initiate polymerization of monomers contained in a solvent.

The coating composition or lacquer of this invention is conveniently applied to film or sheet material by passing the material through a lacquer bath or by spraying the sheet material on one or both sides with the lacquer. Any method of application which will provide a continuous uniform coating is applicable. The solvents are removed and the coated sheet material is subjected to an elevated temperature which, when wax is employed, is at least equal to the melting point thereof. The coated material is then cooled and a clear transparent sheet results.

The film former (cellulose derivative) in the coating composition of the present invention may be varied from about 40 to 99.9% by weight based on the lacquer solids.

The following examples are set forth to demonstrate the present invention. All coating compositions employed were applied to one side of a regenerated cellulose film having a thickness of about 0.9 mil. The lacquer contained about 10% solids and a remainder of solvent consisting of a major proportion of toluene with butyl acetate, ethyl alcohol and butyl alcohol. The parts set forth in the following examples are by weight based on the lacquer solids.

EXAMPLE I

Polyvinyl cyclohexane is prepared as follows: 2 ml. of titanium tetrachloride and 5 ml. of aluminum triisobutyl are mixed in 200 ml. of heptane and warmed to 50° C. for 30 minutes. 40 ml. of vinyl cyclohexane are added and the reaction mixture is then heated to reflux for 44 hours. At the end of this time, the mixture is cooled to room temperature and 100 ml. of isopropanol are added. A polymer material is precipitated by stirring the entire reaction mixture into 800 ml. of methanol, 100 ml. of water and 100 ml. of hydrochloric acid. The precipitated polymer is filtered off, washed with isopropanol, washed free of acid with water and finally dried under vacuum at 60° C. The polyvinyl cyclohexane was soluble in a lacquer such as used for the coatings of this invention.

The following table demonstrates the effectiveness of polyvinyl cyclohexane in various coating compositions applied to regenerated cellulose film in improving slip and block properties. As set forth in the following table, "grab" is an indication of the degree of slip. If there is no grab, the slip properties of the film are excellent.

*Table I*

[Parts]

| Solid components | Runs | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Nitrocellulose | ¹100 | ¹100 | ¹100 | ¹100 | 48 | 48 | 50 | 50 | 50 | 50 | 58 | 58 | 58 | 58 |
| Polyvinyl cyclohexane | 0 | 0.5 | 1.0 | 2.0 | | 0.5 | | 0.5 | | 0.5 | | 0.5 | | 0.5 |
| Phthalimidoethyl propionate | | | | | 35 | 35 | 24.5 | 24.5 | | | | | | |
| Dibutyl phthalate | | | | | 5 | 5 | | | | | | | | |
| Copal resin (Kopol 501) | | | | | 6 | 6 | | | | | | | | |
| Paraffin wax (M.P. 143–150° F.) | | | | | 4 | 4 | 4 | 4 | 6 | 6 | 5.5 | 5.5 | 6.0 | 6.0 |
| Styrene, butadiene copolymer | | | | | 1 | 1 | | | | | | | | |
| Trioctyl phosphate | | | | | | | 7 | 7 | 5 | 5 | 4 | 4 | 4 | 5 |
| Maleic anhydride modified rosin | | | | | | | 2 | 2 | 18 | 18 | 4 | 4 | 4 | 4 |
| Polyester (alkyd) plasticizer | | | | | | | | | 20 | 20 | | | | |
| Glycerol modified rosin | | | | | | | | | | | 16 | 16 | 16 | 16 |
| Tri-p-tert-butyl phenyl phosphate | | | | | | | 10 | 10 | | | | | | |
| Grab | M | N | N | N | SL | N | B | SL | SL | N | SL | N | SL | N |
| Blocking | M | N | N | N | SL | N | B | M | SL | N | SL | N | SL | N |

¹ This figure represents the total amount of solids in a nitrocellulose lacquer used for coating a commercially available nitrocellulose coated cellophane film. The lacquer contained about 50 parts of nitrocellulose, about 23 parts of a dialkylphthalate, about 17 parts of a plasticizer combination of phthalimidoethyl propionate and a trialkyl citrate, about 4 parts of a paraffin wax, 4 parts of a maleic acid modified rosin, 1 part of a modified alkyd resin release agent, 1 part of a styrene butadiene copolymer, 0.5 part blown oil and about 2.2 parts of a wax-clay anti-blocking agent.

NOTE.—N=None; SL=Slight; M=Medium; B=Bad.

The data set forth in the foregoing table clearly demonstrates the excellent results obtained with respect to slip and blocking properties for films coated with nitrocellulose containing a minor amount of crystalline polyvinyl cyclohexane.

EXAMPLE II

Polyallyl cyclohexane is prepared in the same manner as polyvinyl cyclohexane of Example I except that 40 ml. of allyl cyclohexane are used in place of the 40 ml. of vinylhexane. The polyallyl cyclohexane is soluble in a coating lacquer as prescribed for this invention.

The following table demonstrates the effectiveness of polyallyl cyclohexane in improving slip and anti-blocking properties of films coated with lacquers containing minor amounts of that polymer.

Table II
[Parts]

| Solid components | Runs | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Nitrocellulose | ¹100 | ¹100 | ¹100 | ¹100 | 48 | 48 | 50 | 50 | 50 | 50 | 58 | 58 | 58 | 58 |
| Polyallyl cyclohexane | 0 | 0.5 | 1.0 | 2.0 | 0 | 1.0 | 0 | 1.0 | 0 | 1.0 | 0 | 1.0 | 0 | 1.0 |
| Phthalimidoethyl propionate | | | | | 35 | 35 | 24.5 | 24.5 | | | 15 | 15 | 11 | 11 |
| Dibutyl phthalate | | | | | 5 | 5 | | | | | | | | |
| Copal resin (Kopol 501) | | | | | 6 | 6 | | | | | | | | |
| Paraffin wax (M.P. 143-150° F.) | | | | | 4 | 4 | 4 | 4 | 6 | 6 | 5.5 | 5.5 | 6 | 6 |
| Styrene-butadiene copolymer | | | | | 1.0 | 1.0 | | | | | | | | |
| Trioctyl phosphate | | | | | | | 7 | 7 | 5 | 5 | 4 | 4 | 4 | 4 |
| Maleic anhydride modified rosin | | | | | | | 2 | 2 | 18 | 18 | 4 | 4 | 4 | 4 |
| Polyester (alkyd) plasticizer | | | | | | | | | 20 | 20 | | | | |
| Glycerol modified rosin | | | | | | | | | | | 16 | 16 | 16 | 16 |
| Tri-p-tert-butyl phenyl phosphate | | | | | | | 10 | 10 | | | | | | |
| Grab | M | N | N | N | SL | N | B | B | SL | N | SL | N | SL | N |
| Blocking | M | N | N | N | SL | N | VB | M | SL | N | SL | N | SL | N |

¹ This figure represents the total amount of solids in a nitrocellulose lacquer as described for runs 1, 2, 3 and 4 of Table I.

NOTE.—N=None; SL=Slight; M=Medium; B=Bad; VB=Very bad.

It is obvious on examination of the data set forth in the foregoing table that polyallyl cyclohexane lends much improved slip and anti-blocking properties to film when incorporated in minor amounts in coating compositions applied thereto.

EXAMPLE III

Poly-4-phenyl butene-1 is prepared as follows: 86 gms. of 4-phenyl-1-butene was added to a catalyst slurry in a polymerization flask consisting of 400 ml. of hexane, 14.0 ml. of aluminum triisobutyl and 6.0 ml. of titanium tetrachloride. The reaction mixture was refluxed for 20 hours and the mixture was washed with 3–100 ml. portions of isopropanol and washed again with 2–50 ml. portions of methanol. The polymer was extracted with hot heptane to remove heptane soluble polymer which equaled 2.5 gms. The insoluble polymer weighed 34.4 gms.

The prepared poly-4-phenyl-1-butene is soluble in lacquers used as coating solutions for this invention.

The following table is set forth to demonstrate the excellent results obtained with respect to improved slip and anti-blocking properties with films having coatings containing minor amounts of poly-4-phenyl-1-butene.

Table III
[Parts]

| Solid components | Runs | | | | | |
|---|---|---|---|---|---|---|
| | 1 | 2 | 3 | 4 | 5 | 6 |
| Nitrocellulose | 48 | 48 | 50 | 50 | 50 | 50 |
| Poly-4-phenyl-1-butene | | 1.0 | | 0.5 | | 0.5 |
| Phthalimidoethyl propionate | 35 | 35 | 24.5 | 24.5 | | |
| Dibutyl phthalate | 5 | 5 | | | | |
| Copal resin (Kopol 501) | 6 | 6 | | | | |
| Paraffin wax (M.P. 145-150° F.) | 4 | 4 | 4 | 4 | 6 | 6 |
| Styrene-butadiene copolymer | 1 | 1 | | | | |
| Trioctyl phosphate | | | 7 | 7 | 5 | 5 |
| Maleic anhydride modified rosin | | | 2 | 2 | 18 | 18 |
| Triethylene glycol dibenzoate | | | 10 | 10 | | |
| Polyester (alkyd) plasticizer | | | | | 20 | 20 |
| Grab | SL | N | B | N | SL | N |
| Blocking | SL | N | VB | N | SL | N |

NOTE.—N=None; SL=Slight; M=Medium; B=Bad; VB=Very bad.

The superior results obtained in improving slip and anti-blocking properties of films by using coatings containing minor amounts of poly-4-phenyl-1-butene are clearly shown by the data contained in Table III.

The foregoing tabulated data proving the superiority of cellulose derivative film coatings containing small amounts of the polymers of this invention, are even more surprising when considered with the negative results afforded by the incorporation of a crystalline polystyrene prepared as follows: 22 parts by weight of tri- ethyl aluminum was added to a solution of 13 parts of titanium tetrachloride in 880 parts of benzene. The resulting solution was stirred for 15 minutes at room temperature and then 360 parts of styrene was added and the temperature of the reaction mixture raised to 70° C. The mixture was stirred for seven hours at this temperature and then the reaction was quenched with 80 parts of isopropanol. The reaction product was washed with methanol till free of color, extracted three times with hot methyl ethyl ketone, and dried under vacuum at 60 C. The crystalline polystyrene was soluble in additive amounts in the nitrocellulose lacquers used herein.

The above prepared polystyrene was incorporated in nitrocellulose lacquers as described in the tables of Examples I, II and III in amounts ranging from 0.25 to 2.0% based on the lacquer solids. In these amounts the polystyrene was incompatible with the nitrocellulose coating and degraded the film without improving the anti-blocking and slip properties thereof. These results further demonstrate that the improvement afforded by the specified crystalline polymers of this invention is unexpected.

The crystalline polymers of this invention have an additional advantage over prior art anti-blocking agents such as clays, silica and wax in that they maintain the excellent clarity of film and do not tend to produce haze when used in the prescribed amounts.

The polymers of this invention, namely, polyvinyl cyclohexane, polyallyl cyclohexane and poly-4-phenyl-butene-1, not only improve the slip and anti-blocking properties of films coated with cellulose derivatives containing minor amounts thereof but do not degrade or destroy other properties which the coated films possess such as heat seal, moistureproofness, anchorage, etc.

Various changes and modifications may be made in practicing the invention without departing from the spirit and scope thereof, and therefore, the invention is not to be limited except as defined in the appended claims.

I claim:

1. A lacquer coating composition for film comprising from about 40 to 99.9% based on the weight of the solids of a film former selected from the group consisting of organic solvent-soluble cellulose ethers and cellulose esters, from about 0.1 to about 3.0% based on the weight of the solids of a crystalline polymer selected from the group consisting of polyvinyl cyclohexane, polyallyl cyclohexane and poly-4-phenyl-1-butene, and an organic solvent.

2. The coating composition of claim 1 wherein the crystalline polymer is polyvinyl cyclohexane which is present in the amount of from about 0.5 to about 2.0% based on the weight of the solids.

3. The coating composition of claim 1 wherein the crystalline polymer is polyallyl cyclohexane which is present in the amount of from about 0.5 to about 2.0% based on the weight of the solids.

4. The coating composition of claim 1 wherein the crystalline polymer is poly-4-phenyl-1-butene which is present in the amount of from about 0.5 to about 2.0% based on the weight of the solids.

5. The coating composition of claim 1 wherein the film former is nitrocellulose.

6. A lacquer coating composition for film comprising from about 40 to 99.9% based on the weight of the solids of nitrocellulose, from about 0.1 to about 3.0% based on the weight of the solids of a crystalline polymer selected from the group consisting of polyvinyl cyclohexane, polyallyl cyclohexane and poly-4-phenyl-1-butene, from about 5 to 50% by weight, based on solids, of a plasticizing agent, from about 1 to 10% based on the weight of the solids of a moistureproofing wax, and an organic solvent, whereby the total solids content does not exceed 100%.

7. An improved coated film comprising a base sheet of regenerated cellulose, and a coating covering a surface of said sheet comprising from about 40 to 99.9% by weight, based on the coating, of a film former selected from the group consisting of organic solvent-soluble cellulose ethers and cellulose esters and from about 0.1 to about 3.0% by weight, based on the coating, of a crystalline polymer selected from the group consisting of polyvinyl cyclohexane, polyallyl cyclohexane and poly-4-phenyl-1-butene.

8. The coated film of claim 7 wherein the film former is nitrocellulose.

9. The coated film of claim 7 wherein the crystalline polymer is polyvinyl cyclohexane.

10. The coated film of claim 7 wherein the crystalline polymer is polyallyl cyclohexane.

11. The coated film of claim 7 wherein the crystalline polymer is poly-4-phenyl-1-butene.

References Cited in the file of this patent

UNITED STATES PATENTS

| | | |
|---|---|---|
| 2,292,393 | Mitchell | Aug. 11, 1942 |
| 2,839,514 | Shokal et al. | June 17, 1958 |
| 2,936,302 | Jones et al. | May 10, 1960 |

UNITED STATES PATENT OFFICE
CERTIFICATE OF CORRECTION

Patent No. 3,051,670　　　　　　　　　　　　　　　　August 28, 1962

William G. Grantham

It is hereby certified that error appears in the above numbered patent requiring correction and that the said Letters Patent should read as corrected below.

Column 2, line 13, for "selp-sustaining" read -- self-sustaining --; line 47, for "maletic" read -- maleic --; columns 3 and 4, Table I, fifteenth column, line 8 thereof, for "5" read -- 4 --; same Table I, footnote 1, line 4 thereof, for "agent.", first occurrence, read -- agent, --; column 6, line 31, for "60 C." read 60° C. --; column 7, line 13, after "on" insert -- the --.

Signed and sealed this 15th day of January 1963.

(SEAL)
Attest:

ERNEST W. SWIDER　　　　　　　　　　　　　　　　　DAVID L. LADD
Attesting Officer　　　　　　　　　　　　　　　　Commissioner of Patents